Jan. 10, 1956 L. TITUS ET AL 2,729,855
METHODS FOR MAKING SHAPED ARTICLES
Filed Oct. 16, 1952
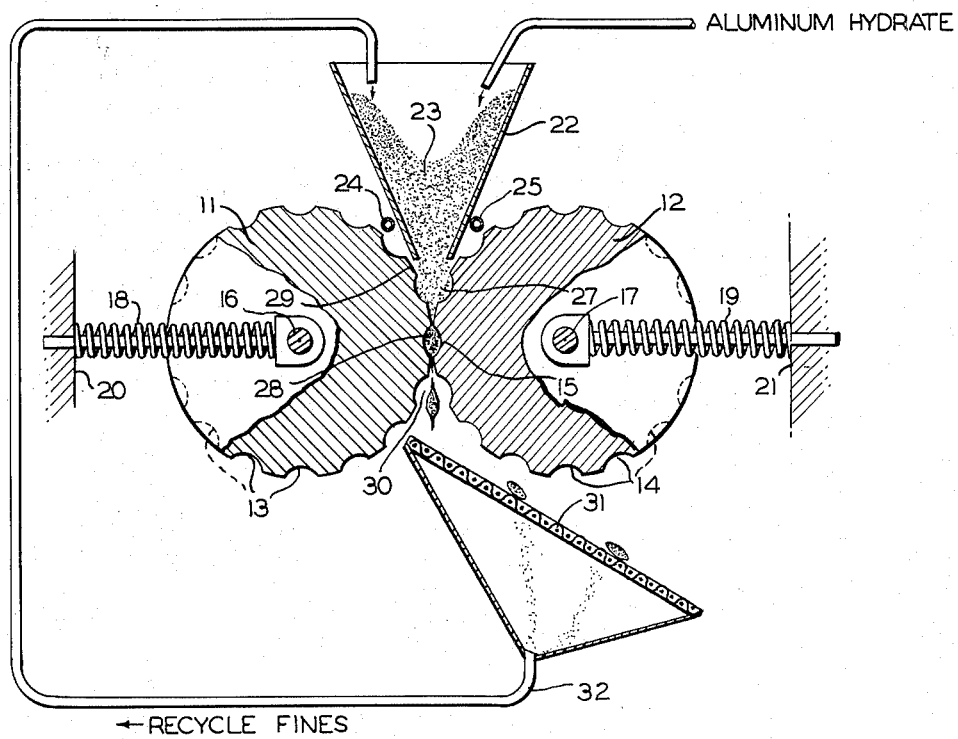
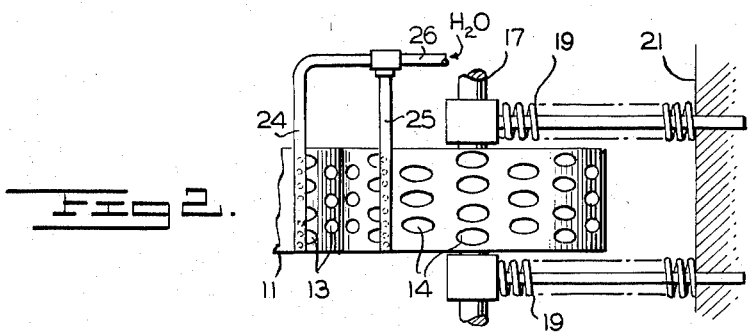
INVENTORS
LESLIE TITUS and
WILLIAM F. VAN LOENEN
BY James E. Toomey
ATTORNEY

United States Patent Office 2,729,855
Patented Jan. 10, 1956

2,729,855

METHODS FOR MAKING SHAPED ARTICLES

Leslie Titus, Campbell, Calif., and William F. Van Loenen, Baton Rouge, La., assignors to Kaiser Aluminum & Chemical Corporation, Oakland, Calif., a corporation of Delaware Application October 16, 1952, Serial No. 315,122

8 Claims. (Cl. 18—55)

This invention relates to novel methods or processes for obtaining shaped bodies of alumina and hydrated alumina containing materials and to the novel articles or products resulting therefrom. More particularly, this invention relates to a method of briquetting particulate hydrated alumina containing material in briquetting apparatus without the use of special binders and/or lubricants. Specifically, the hereinafter described invention relates to a method of substantially increasing the output of roll type briquetting machines when particulate hydrated alumina is briquetted therein without the use of binders and/or lubricants mixed with the hydrate or lubricants added to the machine, and of providing briquettes of substantially increased strength which can be readily calcined without breakage prior and subsequent to such operation.

When briquetting alumina hydrate containing materials in briquetting apparatus, such as the roll type, with which the present invention will be described, although obviously it is not limited thereto, the particulate solids are subjected to high pressures between moving rolls. The rolls abut and contain dies located around the periphery which form pockets shaping the briquette during compression.

In the process of briquetting hydrated alumina a considerable amount of recycle is necessary due to the amount of broken briquettes obtained. This is believed caused by the hydrate sticking in the die pockets giving rise, after compression, to a shearing stress being placed on the briquettes on release of the rolls and their dies. Moreover, the pockets clog up and are thereafter ineffective in producing briquettes on the next cycle of the rolls and in some cases the material must be chiseled from the die pockets. It is not uncommon to have better than 50% of the briquettes broken when briquetting hydrated alumina without the aid of binders and/or lubricants. Even with binders and lubricants, the yield of unbroken briquettes of requisite strength is low. Since the pieces of broken briquettes as well as normal amounts of "lands" and granules of fines from incomplete briquetting must be recycled in order to utilize the full supply of material, the need for overcoming this sticking and clogging of the rolls is apparent for the purpose of increasing the through put of the apparatus. Increased strengths are requisite for subsequent handling before and after calcination for use in the preparation of aluminum fluoride, the control of dust losses, to support beds of sufficient depth, and so forth.

Accordingly, it is a primary object of the herein described invention to provide a method of producing shaped alumina and hydrated alumina containing materials with an increase in the number of whole briquettes formed as well as an increase in the strength thereof.

It is another object of the herein described invention to provide a method for increasing the output of roll type briquetting machines when briquetting hydrated alumina without the addition of binders or lubricants or the steps necessary to use them.

It is yet another object of this invention to provide a method for producing calcined alumina containing briquettes having increased strength with an increase in the number of whole briquettes obtained.

It is a further object of this invention to provide a method for obtaining alumina containing briquettes especially useful for the production of aluminum fluoride.

It is a still further object of the present invention to provide novel alumina hydrate containing briquettes.

It is again an object of this invention to provide novel alumina containing briquettes.

It is yet again an object of this invention to provide alumina containing briquettes especially suitable in the production of aluminum fluoride.

These and other objects and advantages of the present invention will become more apparent from the following detailed description, examples, and drawing, wherein:

Figure 1 is a schematic diagram of an arrangement of apparatus for briquetting hydrated alumina, and Figure 2 is a top plan view of a portion of the apparatus shown in Figure 1 showing the location of the die pockets according to some types of briquetting apparatus.

It has now been discovered according to the present invention that shaped bodies can easily be produced from a mass of particulate hydrated alumina containing material by providing a film or layer of a volatile liquid on the pressing surfaces entering the compression zone, feeding hydrate to said zone in amount sufficient to establish a pressure on the material to briquet the same, maintaining a temperature above the atmospheric boiling point of the liquid in the compression zone, and thereafter releasing the pressure on the pressing surfaces so that the liquid volatilizes, that is vaporizes or flashes at atmospheric pressure, thus materially aiding in discharging the briquettes from the dies. This method essentially completely eliminates clogging of the dies and greatly reduces the incidence of broken pellets so that the production of whole bodies is almost 100% and material recirculation is minimized. The method is further characterized by providing bodies of greatly increased breaking strengths before and after calcination.

The establishing and maintaining of a temperature above the atmospheric boiling point of the volatile liquid in the compression zone may be accomplished solely from the heat generated by the pressure or the latter may be supplemented by heat input.

Such additional heat if supplied to the pressing or compression zone, can readily be furnished in a number of ways. For example, the heat may be obtained by heating the dies or rolls of the briquetting apparatus by means of pipes and so forth carrying heated water or gas adjacent, or in heat exchange relationship with, the surfaces of the rolls. Another method is to supply water at an elevated temperature to the rolls. Still another method at present preferred is to heat the hydrate or furnish hydrate already heated by the driers used in removing the free water from the precipitated hydrate. Combinations of any of the foregoing techniques may be employed.

It, of course, will be understood that in many instances sufficient heat will be generated by the pressure developed during formation of briquettes as a result of friction, compression, etc., to provide the increase in temperature requisite for flashing after compression. Such generation of heat is accomplished by subjecting the hydrate feed to pressures sufficient to raise the temperature above the boiling point of the liquid. If the temperature rises too high so that a film of volatile liquid will not remain on the roll surfaces, the rolls can be cooled by supplying water to the surfaces thereof by means of a dip pan or additional sprays or the temperature of the feed reduced if it is supplied heated. It is only necessary that the temperature of the pressing surfaces entering the compression zone be maintained such that the liquid film exists and that sufficient heat be available during compression in said zone to effect an increase in temperature so that on release of pressure from the die surfaces the liquid will flash at atmospheric pressure.

In case of water as the liquid, the hydrate may be fed to the rolls at temperatures less than about 212° F. as the heat generated during compression will cause flashing on release of pressure. Further, the feed may be at a higher temperature, up to about 350° F. although increased amounts of water may be necessary to cool the roll surfaces to maintain the necessary film. However, it is preferable that the resultant temperature of the hydrate feed and the wetted rolls be at about 200° F. upon entering the compression zone. Further, a feed which is heated tends to flow better through the hopper to the dies and thus facilitates operations. In any case, it is preferred to so regulate the feed temperature and amount of liquid on the rolls that the liquid film on the rolls entering the compression zone is just below the boiling point thereof.

The hydrated alumina containing material herein disclosed is defined to mean in the specification and claims alumina, alumina hydrate in any of its various forms, and mixtures of alumina and alumina hydrate, partially hydrated or partially dehydrated alumina. The material treated is predominantly hydrated alumina and has the characteristics thereof. In addition, in its calcined form, the alumina containing material, may contain various amounts of residual water, etc., depending on time and temperature of calcination as is well known in the art. The alumina and hydrated alumina containing materials may also contain minor amounts of impurities or adventitious materials which do not adversely affect the properties of the resulting articles, and, it, of course, is within the purview of this invention that such materials may also contain minor amounts of catalysts as well as materials which promote the catalytic activity of the alumina and/or hydrate.

Likewise, lubricants and binders may be present, but as will be pointed out hereinafter, their use generally leads to less satisfactory results, and in some cases is detrimental such as producing sticking in the dies, or brittleness and spalling of the pellets. Accordingly, it is an advantage of the present invention that customary binders or lubricants are avoided while achieving the new and unexpected results herein disclosed, elimination of sticking and breakage. In addition, the use of such binders or lubricants complicates the process by adding extra steps. The alumina hydrate containing feed may also contain residual amounts of silica, sodium aluminate or sodium hydroxide remaining from the precipitation and filtration process of preparing the hydrate. The hydrate should be dry or essentially dry as fed to the briquetting apparatus. However, it is obvious that it may contain a minor amount of moisture from incomplete drying in the driers or by pick up from the atmosphere during storage or between the driers and pressing station. The hydrated alumina containing material is used in particulate form, that is coarse to very fine or pulverulent particle size. For most purposes, it is best to use a mixture of sizes ranging from coarse to very fine. Further, the use of the term briquetting is defined to mean also pelleting, pilling, tabletting, and so forth.

The preferred volatile liquid is water, because of economy and availability, although other liquids which would not adversely affect the hydrate feed or the pressing (roll) surfaces may be employed, particularly those having boiling points of about the same order as water. Further, the liquid may be a solution, that is, it can contain various amounts of dissolved solids, such as sodium hydroxide or sodium carbonate, etc. Sodium aluminate solutions of varying concentrations, for example, Bayer plant spent liquor, have been effectively employed.

The water or other liquid is usually not heated, since with the preferred heated feed of hydrate, the resultant temperature at the entry point of the compression zone will be sufficient to raise the temperature to just below the boiling point. However, the invention includes cold hydrate feed with cold water feed where the heat generated in the compression zone is sufficient to raise the temperature above the boiling point for ejection by flashing of the liquid to vapor on release of pressure. In fact, the sticking problem with cold hydrate feed is aggravated, and the wetting of the rolls substantially eliminates such sticking with cold hydrate, as well as with a hot hydrate feed.

The water, preferably as a spray, may be added to the rolls in a number of ways such as by nozzles or a perforated pipe. However, any other suitable means may be employed such as having the rolls dip into a pan or trough containing water or by means of moistened rollers contacting the compression rolls or by a combination of these methods. It has been found best to position a spray as close to the feed point and compression zone as possible. Regardless of the method of application, it is essential that the amount of water be sufficient to maintain the rolls in a wetted condition until compression occurs to provide a film of moisture between the die surfaces and the hydrate mass surfaces.

Instead of using roll type apparatus, it is entirely feasible to use stationary or reciprocating presses. The die or mold surfaces of the press can be moistened with temperature conditions established and maintained to produce vapor at the pellet-die interface upon opening the mold. Thus, the wetted mold is closed and the feed compressed at pressures sufficient to form the pellet and produce a temperature above the boiling point of the water, and the mold is then opened to obtain ejection of the pellets without sticking. The briquetting apparatuses described herein may be operated at various speeds, pressures, etc., as is well known in the art. Furthermore, it is within the scope of this invention to utilize smooth rolls with no die pockets for the purpose of flocculating or predensifying aluminum hydrate to reduce dust losses in calcining, handling and at pot line operations, and to obtain more rapid heat transfer.

After briquetting, the briquettes are readily calcined at a temperature of about 840° F. for three hours to remove at least a portion of the chemically bound water to provide an activated alumina containing briquette suitable for use in the production of aluminum fluoride by passing HF through a bed of the briquetted material at a reaction temperature of from about 660 to about 1200° F. The temperature may be raised or lowered as desired to remove more or less water and the time of calcination suitably adjusted thereto such as is well known in the art. For example, the temperature may vary from about 400° F. to about 1500° F. or higher if dead burned material is desired and the time from a few minutes to several hours. Other uses of the calcined articles are as adsorbents and/or catalysts (activated alumina), catalyst carriers, cements, and so forth.

It is noteworthy, as will be hereinafter more clearly set forth in the examples, that the briquettes produced according to the present invention exhibited a high breaking strength and larger percentage of whole briquettes than in comparative tests wherein no water was maintained on the roll surface.

The following examples will serve to illustrate the invention with more particularity to those skilled in the art.

EXAMPLE I

The apparatus used was a Komerak-Greaves briquetting machine as illustrated diagrammatically in Figures 1 and 2 of the drawing. It contained two abutting rolls 11 and 12 and die pockets 13 and 14 located around the periphery of each roll and spaced as to be coincident with a pocket on the adjacent roll at the point of compression, for example, as shown by the die pockets at 15. The rolls were driven by means of drive shafts 16 and 17 in rolls 11 and 12, respectively. The force causing compression was applied to rolls 11 and 12 by springs 18 and 19 held under compression through contact with stationary points 20 and 21 such as a housing not shown. Feed hopper 22 or other suitable means was provided for feeding hydrate 23 to the rolls. Spray nozzles 24 and 25 were provided for spraying the rolls prior to contacting the hydrate which nozzles were fed with water by means of pipe 26.

The alumina hydrate feed varying from +100 to −325 mesh of which about 85.4% was +325 mesh at a temperature of 200° F. was fed to hopper 22 where it fell to zone 27 defined by die pockets 13 in clockwise turning roll 11 and 14 in counterclockwise turning roll 12. As the rolls turned at about 5 R. P. M. the hydrate was compressed at 30,000 pounds across the face of the rolls into the form of briquette 28 (almond shaped—about 1⅛″ long x ²⁵⁄₃₂″ wide max. x ⁹⁄₁₆″ max. thick weighing about 16 grams) by means of the compression exerted on rolls 11 and 12 respectively thru springs 18 and 19 which in turn compressed the briquette. In operation the rolls never touched because of steel spacers or shims which are installed to prevent possibility of contact. This insures the formation of a "land" between the pockets as shown by a small amount of hydrated alumina which entered the zone at the outer periphery between the die pockets on the same roll as at 29 forming the "land" on the pellet about a minimum of ⅟₁₆″ thick as it discharged. This "land" readily broke off during subsequent handling and screening. The formed briquette was discharged from the die pockets as the die pockets separated at 30 falling to screen 31 wherein the fines including "lands" were recycled by suitable means indicated by line 32 and fed to hopper 22 after screening through a ¼″ screen. A ball mill may be utilized if desired to increase the uniformity of feed. The briquettes produced by the herein described pressing operation and discharged from the screen were calcined at 840° F. to provide an activated alumina briquette.

The water added to rolls 11 and 12 through spray nozzles 24 and 25 respectively formed a film on the rolls. This film according to one theory of operation is heated by contacting the heated hydrate in die pockets 13 and 14 and is further heated by friction during the compression period at point 15. Thereafter, as the dies moved apart at the point represented by 30 the pressure was released from the water, which had been superheated by the heat generated during compression, and it flashed, thus aiding in the expulsion of the briquette from the die and eliminating sticking and breakage. It, of course, is to be understood that the invention is not to be limited in any manner by the theory herein presented, but it suffices to state that the action of the wetted pressing surfaces and a controlled temperature in the compression zone eliminates sticking and minimizes breakage while obtaining pellets of improved strength.

Additional tests were conducted which demonstrates the advantages obtained by the addition of water to the roll surfaces when briquetting. These tests were conducted with about 30,000 pounds pressure across the face of the rolls moving at about 5 R. P. M. Tests 1, 2, and 3 were conducted without the addition of water to the rolls. However, in test 3 water was mixed with the hydrate in the amount of 2.5/100 weight ratio of water to hydrate prior to briquetting. Test 4 is presented for comparative purposes showing the effect of spraying water on the rolls in increasing the number of whole briquettes produced free of cracks and chips as well as in eliminating the stresses in the briquettes which otherwise form. The "as is" breaking strength is a measure of the breaking strength prior to calcining. Calcined briquettes were heated to 842° F. for 3 hours. Tests 4 and 5 clearly show an increase in the number of whole briquettes, produced by the combination of providing a film of water and heat as compared to tests 1 and 2 wherein water was not added and test 3 wherein the hydrate feed was mixed with water. Moreover, the breaking strength (pounds required to fracture or crush briquette between parallel smooth surfaces) materially increased over briquettes obtained from the other tests. The increase in breaking strength after calcination is more than 100% as compared to briquettes made in other tests.

*Table*

| Test No. | Alumina Hydrate Feed, Temp., °F. | Film of Water in Compression Zone | Whole Briquettes Obtained | Breaking Strength (pounds) | |
|---|---|---|---|---|---|
| | | | | "As is" | Calcined |
| 1 | 160 | No | 60 | 150 | 82 |
| 2 | 330 | No | 80 | 159 | 122 |
| 3¹ | 175 | No | 90 | (²) | (²) |
| 4 | 350 | Yes | 99 | 250 | 270 |
| 5 | 200 | Yes | 99 | 250 | 260 |

¹ Hydrate feed mixed with water in 2.5H₂O/100Al₂O₃.3H₂O weight ratio.
² Briquette too soft to handle.

Further tests were conducted in which a lubricant was added to the hydrate feed or to the rolls. When aluminum stearate, about 0.25% by weight, was mixed with the hydrate, the resulting "as is" briquettes exhibited a strength of only about 150 pounds and the proportion of whole briquettes obtained was only about 50%. With a light lubricating oil on the rolls, the results were less favorable with excessive sticking of the pellets in the die pockets.

In summary, it is apparent that the present invention teaches that new and unexpected increases in strength of briquettes and in the number of whole briquettes obtained and in the essentially complete elimination of sticking can be realized by merely maintaining a film of water on the pressing surfaces entering the compression zone and providing sufficient heat to raise the temperature of the volatile liquid above its vaporization point so that it will flash or rapidly vaporize on release of pressure to eject the briquettes. The briquettes so obtained are harder than briquettes made without the use of volatile liquid such as water. Further, the addition of expensive binders or lubricants is avoided as well as the concomitant steps and equipment necessary to insure thorough mixing and any subsequent steps required to remove the lubricant. Again, the hydrate can advantageously be fed directly to the compression zone in heated condition from the driers used for removing the mechanically held water of the precipitated and filtered aluminum hydrate. Also, as the amount of fines and broken pellets is decreased, the equipment capacity is increased by reducing recirculation of fines back to the feed.

What we claim is:

1. The method of producing shaped bodies from hydrated alumina containing material characterized by an increase in the amount of whole bodies obtained and the essentially complete elimination of sticking of the material to the pressing surfaces which comprises providing a compression zone with a volatile liquid in an amount sufficient to maintain a film on the pressing surfaces thereof, delivering particulate alumina hydrate containing material to said zone in an amount sufficient to form a briquette, compressing said surfaces to effect formation of a briquette in said compression zone while maintaining the temperature in said zone sufficient to heat the liquid above its atmospheric boiling point, and releasing the pressure from said surfaces to permit vaporization of said liquid and ejection of the resulting briquette.

2. The method of producing shaped bodies according to claim 1 containing the additional step of calcining the formed briquette to remove at least a portion of the water of constitution.

3. The method of producing pellets of hydrated alumina characterized by an increase in the amount of whole pellets obtained and the substantially complete elimination of sticking, comprising supplying to a compression zone water in an amount sufficient to form a film on the pressing surfaces of said zone, delivering a mass of particulate hydrated alumina to said zone containing said film, and then compressing said mass while establishing and maintaining a pressure sufficient to form a dense hard pellet and a temperature sufficient to produce steam on release of said pressure to eject the pellet.

4. The method of producing shaped bodies from predominantly hydrated alumina containing material particularly useful in the production of aluminum fluoride, characterized by an increase in the amount of whole bodies obtained and the substantially complete elimination of clogging, comprising supplying to a pressing zone water in an amount sufficient to form a film on the pressing surfaces of said zone, delivering a mass of particulate predominantly hydrated alumina containing material at a temperature not above about 350° F. to said zone while maintaining the wetted pressing surfaces entering said zone below the atmospheric boiling point of the water, compressing said mass at a pressure sufficient to form a dense hard briquette and to increase the temperature above the atmospheric boiling point of the water, releasing the pressure to permit vaporization of said water and ejection of the briquette, and finally calcining said briquette at a temperature of from about 400 to about 1500° F. for a period of time sufficient to remove a portion of the water of constitution and to activate the alumina of the briquettes.

5. The method of producing shaped bodies of particulate predominantly hydrated alumina containing material wherein a mass of said material is delivered to a set of opposing rolls containing dies in the surfaces thereof and revolving in opposite direction to form a compression zone between said rolls, which comprises supplying to the surfaces of said rolls an amount of volatile liquid sufficient to form a film thereon, delivering a mass of particulate predominantly hydrated alumina containing material to said zone in an amount sufficient to form a briquette, and compressing said mass to produce a pressure sufficient to form a dense hard briquette and to establish and maintain a temperature in said zone above the atmospheric boiling point of said liquid.

6. A method of producing alumina hydrate pellets which comprises maintaining a film of water on the pressing surfaces of a pellet-forming compression zone, and feeding alumina hydrate to said zone in amount sufficient to form a pellet, and compressing the alumina to produce pellet-forming pressure in said zone and to produce a temperature in said zone in excess of the atmospheric boiling point of the water.

7. A method according to claim 6 in which the alumina hydrate feed is at a temperature such that the temperature of the water on the pressing surfaces prior to compression in the zone is just below its atmospheric boiling point.

8. A method according to claim 7 in which the hydrate feed is at a temperature not exceeding about 200° F.

References Cited in the file of this patent
UNITED STATES PATENTS 874,167   Crow _____ Dec. 17, 1907